United States Patent
Pawar et al.

(10) Patent No.: US 11,457,382 B1
(45) Date of Patent: Sep. 27, 2022

(54) PROACTIVE INCREASE OF BEARER QUALITY OF SERVICE (QOS) IN RESPONSE TO PREDICTION THAT UE WILL EXPERIENCE REDUCED-THROUGHPUT COVERAGE WHILE RECEIVING STREAMING MEDIA

(71) Applicant: Sprint Spectrum L.P., Overland Park, KS (US)

(72) Inventors: Hemanth B. Pawar, Brambleton, VA (US); Krishna Sitaram, Chantilly, VA (US); Shilpa K. Srinivas, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/901,308

(22) Filed: Jun. 15, 2020

(51) Int. Cl.
*H04W 28/08* (2009.01)
*H04W 76/16* (2018.01)
*H04W 28/24* (2009.01)
*H04W 28/02* (2009.01)

(52) U.S. Cl.
CPC ... *H04W 28/0942* (2020.05); *H04W 28/0257* (2013.01); *H04W 28/0268* (2013.01); *H04W 28/0967* (2020.05); *H04W 28/24* (2013.01); *H04W 76/16* (2018.02)

(58) Field of Classification Search
CPC ............. H04W 28/0942; H04W 28/24; H04W 36/0069; H04L 47/24; H04L 47/22; H04L 43/0888; H04L 65/4084
See application file for complete search history.

(56) References Cited

U.S. PATENT DOCUMENTS

| | | | |
|---|---|---|---|
| 5,519,618 A | 5/1996 | Kastner et al. | |
| 6,308,043 B1 | 10/2001 | Solheim et al. | |
| 8,254,930 B1 | 8/2012 | Mauer et al. | |
| 9,084,166 B1 | 7/2015 | Vargantwar et al. | |
| 10,051,542 B1 | 8/2018 | Mansour | |
| 2005/0265321 A1* | 12/2005 | Rappaport | H04W 16/20 370/352 |
| 2015/0003246 A1* | 1/2015 | Chandramouli | H04L 5/0064 370/235 |
| 2016/0165605 A1 | 6/2016 | Dimou et al. | |

(Continued)

OTHER PUBLICATIONS

Cisco Ultra Traffic Optimization, P-GW Administration Guide, StarOS Release 21.5, printed from the world wide web on Jun. 11, 2020.

(Continued)

*Primary Examiner* — Omer S Mian

(57) ABSTRACT

A method and system for proactively reconfiguring communication to a user equipment device (UE) in anticipation the UE experiencing a coverage-throughput reduction when the UE is receiving streaming media. An example method includes (i) predicting, when the UE is receiving streaming media, that the UE is going to experience the coverage-throughput reduction and (ii) based at least in part on the predicting, proactively increasing a quality-of-service (QoS) level of a bearer through which the UE is receiving the streaming media, the proactively increasing occurring before the UE experiences the coverage-throughput reduction so that the QoS level is increased by when the UE experiences the coverage-throughput reduction.

20 Claims, 4 Drawing Sheets

(56) References Cited

U.S. PATENT DOCUMENTS

| | | | |
|---|---|---|---|
| 2016/0242098 A1 | 8/2016 | Tsukamoto | |
| 2017/0041940 A1* | 2/2017 | Falconetti | H04L 5/006 |
| 2017/0142709 A1* | 5/2017 | Lake | H04L 67/142 |
| 2019/0045399 A1* | 2/2019 | Bongaarts | H04N 21/64738 |
| 2020/0092141 A1* | 3/2020 | Chen | H04L 5/0048 |
| 2021/0267000 A1* | 8/2021 | Jain | H04W 72/10 |

OTHER PUBLICATIONS

Traci Ruether, "Adaptive Bitrate Streaming: How It Works and Why it Matters," https://www.wowza.com/blog/augthor/traciruether, printed from the world wide web on Jun. 11, 2020.

* cited by examiner

46 — PREDICT, WHEN A UE IS RECEIVING STREAMING MEDIA, THAT THE UE IS GOING TO EXPERIENCE A COVERAGE-THROUGHPUT REDUCTION

48 — BASED AT LEAST IN PART ON THE PREDICTING, PROACTIVELY INCREASE A QoS LEVEL OF A BEARER THROUGH WHICH THE UE IS RECEIVING THE STREAMING MEDIA, THE PROACTIVELY INCREASING OCCURRING BEFORE THE UE EXPERIENCES THE COVERAGE-THROUGHPUT REDUCTION, SO THAT THE QoS LEVEL IS INCREASED BY WHEN THE UE EXPERIENCES THE COVERAGE-THROUGHPUT REDUCTION

Fig. 2

50 — PREDICT, WHEN A UE IS RECEIVING STREAMING MEDIA FROM A MEDIA SERVER, THAT THE UE IS GOING TO EXPERIENCE A COVERAGE-THROUGHPUT REDUCTION

52 — BASED AT LEAST IN PART ON THE PREDICTING, PROACTIVELY INITIATE TRANSCODING OF THE STREAMING MEDIA TO REDUCE A BIT RATE OF THE STREAMING MEDIA AS THE STREAMING MEDIA IS EN ROUTE TO THE UE IN A COMMUNICATION PATH BETWEEN THE MEDIA SERVER AND THE UE, THE INITIATING OCCURRING BEFORE THE UE EXPERIENCES THE COVERAGE-THROUGHPUT REDUCTION SO THAT THE BIT RATE OF THE STREAMING MEDIA IS REDUCED BY WHEN THE UE EXPERIENCES THE COVERAGE-THROUGHPUT REDUCTION

Fig. 3

PROACTIVE INCREASE OF BEARER QUALITY OF SERVICE (QOS) IN RESPONSE TO PREDICTION THAT UE WILL EXPERIENCE REDUCED-THROUGHPUT COVERAGE WHILE RECEIVING STREAMING MEDIA

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that may provide connectivity with various application servers and/or transport networks, such as the public switched telephone network (PSTN) and/or the Internet for instance. With this arrangement, a UE within coverage of the cellular network could engage in air interface communication with an access node and may thereby communicate via the access node with various application servers and/or other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of radio access technologies, in a continuous effort to increase available data rate and quality of service. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And more recently, the industry has been exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use. Each such frequency channel could have a respective bandwidth centered on a respective center frequency, defining a respective range of frequency extending from a low-end frequency to a high-end frequency.

Further, on the downlink and uplink respectively, the air interface defined by each carrier under an example RAT could be structured over time and frequency to define physical air-interface resources for carrying information between the access node and UEs.

Without limitation for instance, the air interface could be divided over time into frames, which can be divided in turn into subframes, timeslots, and symbol time-segments. And the carrier bandwidth (frequency width of the carrier on the downlink and/or uplink) could be divided over frequency into subcarriers. As a result, the air interface could define an array of resource elements per subframe, each occupying a respective subcarrier and spanning a respective symbol time segment, and the subcarrier of each such resource element could be modulated using an applicable modulation scheme to carry data over the air. Further, the air interface could be configured to group these resource elements into physical resource blocks (PRBs) across the carrier bandwidth, and the access node could be configured to allocate these PRBs for use to carry data on an as-needed basis.

OVERVIEW

When a UE enters into coverage of such a network, the UE could initially scan for and detect threshold strong coverage of an access node on a carrier, and the UE could responsively engage in random-access and connection signaling, such as Radio Resource Control (RRC) signaling, with the access node to establish a connection between the UE and the access node. Further, if appropriate, the UE could engage in attach signaling via the access node with a core-network controller to attach and thus register for service. And upon initial attachment and/or later during service of the UE, the core-network controller could coordinate setup for the UE of one or more bearers each defining a packet tunnel for carrying packet-data communications between the UE and a core-network gateway system that provides connectivity with a transport network. Further, the gateway system or another entity could assign to the UE an Internet Protocol (IP) address for use by the UE to engage in communication on the transport network.

Each bearer that is established for the UE could have a portion that extends within the core network between the UE's serving access node and the gateway system and a portion that extends over the air between the access node and the UE. Further, each such bearer could have a corresponding, defined quality-of-service (QoS) service level, which could be indicated by one or more bearer attributes stored in context records for the UE at entities along the bearer path, such as at the UE, the access node, and the gateway system. For instance, each bearer could be associated with a particular QoS Class Identifier (QCI) and/or Differential Services Point Code (DSCP) value that defines various QoS attributes of the bearer, such as packet-delay budget, acceptable packet-loss rate, minimum or maximum bit rate, and the like. Entities along the bearer communication path could then work to handle communications on the bearer accordingly.

Once the UE is so connected and registered, the access node could then serve the UE in a connected mode on the carrier, managing downlink air-interface communication of packet data to the UE and uplink air-interface communication of packet data from the UE.

For instance, when an application server or other entity on the transport network transmits data to the IP address of the UE, that data could be routed to the core-network gateway system and could then flow over one of the UE's bearers from the gateway system to the UE. When the access node receives such data for transmission to the UE, the access node could buffer the data pending transmission. And with the example air-interface configuration as described above, the access node could then schedule and provide transmission of the buffered data to the UE in downlink PRBs of upcoming subframes. For instance, the access node could apply a scheduling algorithm to allocate upcoming downlink PRBs to carry the data to the UE. And the access node could transmit to the UE one or more scheduling directives, such as a Downlink Control Information (DCI) messages, designating the PRBs and could transmit data to the UE in those PRBs. In responsive to these scheduling directives, the UE could thus receive the data carried in the designated PRBs.

Likewise, when the UE has data to transmit to the IP address of an application or other entity on the transport network, that data could flow over one of the UE's bearers to the gateway system, which could route the data on the transport network to the IP address. In particular, the UE could buffer the data pending transmission to the access node and could transmit to the access node a scheduling request that carries with it a buffer status report (BSR) indicating how much data the UE has buffered for transmission. And with the example air-interface configuration as described above, the access node could then schedule transmission of the buffered data in uplink PRBs of upcoming subframes, transmitting to the UE one or more scheduling directives designating those PRBs, and the UE could transmit the data to the access node in those PRBs. The data could then flow from the access node to the gateway system, for routing to its destination IP address.

When an access node serves a UE on a carrier, the UE's peak data rate of communication could be defined based on the frequency bandwidth of the carrier and based on the UE's coverage quality. For instance, with an air interface configured as described above, the frequency bandwidth of the carrier defines a limited number of PRBs per subframe, which the access node may sometimes need to fairly allocate among multiple served UEs. Further, the per-PRB bit rate of communication could depend on the UE's channel quality, with higher channel quality correlating with higher per-PRB bit rate (e.g., with use of a higher-order modulation and coding scheme (MCS) for air-interface transmission, and/or with a lower retransmission rate) and lower channel quality correlating with lower per-PRB bit rate (e.g., with use of a lower-order MCS and/or with a higher retransmission rate.)

One way to help increase the UE's peak data rate is for the access node to serve the UE concurrently on multiple carriers. For instance, if supported, the access node could configure carrier-aggregation service for the UE, by adding one or more secondary carriers to the UE's connection and then serving the UE on the combination of multiple carriers. Here, the carrier on which the UE initially connected could be considered the UE's primary component carrier and the anchor for the UE's connection, while each other carrier could be considered a secondary component carrier of the UE's connection. Carrier-aggregation can help to provide the UE with increased peak-data rate compared with service on a single carrier, by increasing the aggregate frequency bandwidth and associated quantity of PRBs available for use to carry data between the access node and the UE.

Another way to help increase UE's peak data rate is to implement dual-connectivity, with the UE being served concurrently on multiple connections, perhaps each according to a different respective RAT. For instance, if supported, once the UE is connected with and served by a first access node on one or more carriers according to a first RAT, the first access node, operating as a master node (MN) or anchor node, might interwork with a second access node, as secondary node (SN), to establish for the UE a secondary connection with the second access node on one or more carriers according to a second RAT and might engage in signaling to establish a split bearer so that the first and second access nodes could then concurrently serve the UE on their respective connections with the UE. Such dual-connectivity or "non-standalone connectivity" (NSA) service can help to provide the UE with increased peak data rate compared with standalone (SA) service on a single connection, by similarly increasing the aggregate frequency bandwidth and associated quantity of PRBs available for use to carry data to/from the UE.

When a UE is connected with and served by an access node, the UE may also regularly monitor its coverage from that access node and available coverage from neighboring access nodes, to help ensure that the UE is served with the best available coverage. The UE could conduct this evaluation primarily with respect to the UE's anchor serving node if dual-connected and with respect to its primary component carrier if served with carrier aggregation. And if and when the UE determines that a handover condition is met for the UE to hand over to a neighboring access node, the UE could then signal to its serving access node, and the serving access node could coordinate handover of the UE to the neighboring access node.

In addition, when a UE is connected and served, one type of the communication that the UE may support engaging in is real-time media streaming—namely, receipt and playout of real-time streaming media, such as video streaming or audio streaming for instance. In a representative scenario, the UE might engage in packet-based control signaling with a media server on a transport network. to establish a streaming media session through which the server would stream media content to the UE in real-time for playout. This process could involve the UE buffering and playing out the media content as the UE receives it, rather than waiting to receive the entirety of a media file before initiating playback. Streaming media sessions could be conducted using any of various standard protocols, such as Real-time Transport Protocol (RTP) and Real-Time Streaming Protocol (RTSP) or Hypertext Transfer Protocol (HTTP), among other possibilities.

When a UE engages in a streaming-media session, transmission of media content to the UE could be handled in largely the manner discussed above. Namely, as the media server transmits to UE data that represents that media, the data could be routed to the core-network gateway system and from the gateway system to the UE's serving access node(s), and the access node(s) could buffer the data pending transmission and, when possible, schedule and provide transmission of the data over the air to the UE.

An example streaming media process could involve adaptive bit-rate streaming, in which the media server dynamically varies the bit rate of the media content that it is streaming to the UE, taking into consideration the quality and/or data-rate supported by the UE's wireless connection(s).

By way of example, the media server could have multiple stored versions of the media content, each being encoded at a different respective bit rate that defines the number of bits per unit time used to represent the media content. A higher bit rate version of the media content might be a higher resolution representation of the media content or may provide additional features, information, or the like related to the media content. With an example of adaptive bit-rate streaming, the media server could dynamically switch between various ones of these versions to stream to the UE, with the selection being based on throughput (bit rate) supported by the UE's connection(s), which could be based in turn on the frequency bandwidth of the UE's connection(s) and/or on one or more other factors (e.g., load, actual throughput observed, historical data, etc.)

For instance, to facilitate the streaming media session, the UE may obtain from the media server a manifest file that indicates the various available versions of the media content.

And the UE could signal to the media server at the start of the session and from time to time throughout the session, to request streaming of one of those versions that the UE selects based on the frequency bandwidth of the UE's connection and/or on other such factors. Thus, the UE might request streaming of a higher bit-rate version (e.g., higher resolution version) of the media content when the UE has higher-throughput connectivity, and the UE might request streaming of a lower bit-rate version (e.g., lower resolution version) of the media content when the UE has lower-throughput connectivity.

Alternatively, at the start of the session and/or from time to time throughout the session, the UE and/or its serving core network might signal to the media server to inform the media server of the level of throughput supported by the UE's connectivity. And the media server might dynamically select and switch between the various versions to stream to the UE, based on that indicated level of throughput support.

One technical problem that can arise in this or other such arrangements is that, if the UE is served with a streaming media session in which the media being streamed is encoded at a first bit rate and if the UE moves into lower throughput coverage, the UE's serving access node(s) could experience difficulty in transmitting the incoming media content to the UE until the media server switches to a lower bit-rate version of the media content. For instance, if the media stream is encoded at a relatively high bit rate selected based on the UE having relatively high-throughput connectivity and if the UE then hands over to be served by an access node over a relatively low-throughput connection, the UE's new serving access node may be unable to transmit the incoming media content quickly enough to the UE. As a result, the new access node may experience a buffer overrun, which might lead to dropped packets, delay, and assorted user experience issues.

The present disclosure provides several mechanisms to help resolve this issue.

In a first aspect, the disclosure provides for predicting, while a UE is engaged in a streaming media session, that the UE will experience a coverage-throughput reduction and, based at least in part on predicting that the UE will experience the coverage-throughput reduction while engaged in the streaming media session and before the UE experiences the coverage-throughput reduction, proactively increasing a QoS level of a bearer on which the UE is receiving the streaming media. Proactively increasing the QoS level of the bearer on which the UE is receiving the streaming media could help facilitate successfully transmitting the media content to the UE even when constrained by the reduced throughput. Namely, the higher QoS level could result in higher priority air-interface transmission of the media content to the UE, which might help to ensure timely and successful transmission of the media content to the UE when there is a contention for limited air-interface resources.

And in a second aspect, the disclosure provides for predicting, while a UE is engaged in a streaming media session, that the UE will experience a coverage-throughput reduction and, based at least in part on predicting that the UE will experience the coverage-throughput reduction while engaged in the streaming media session and before the UE experiences the coverage-throughput reduction, proactively transcoding to a lower bit rate the media content that is en route from the media server to the UE. For instance, in this situation, a transcoder disposed within the core network in the UE's bearer communication path could responsively transcode the incoming media stream to a lower bit rate that may be more easy to transmit to the UE with reduced-throughput connectivity.

Either or both of these proactive actions could be taken just temporarily. For example, either or both action could be taken for a short period of time deemed by engineering design to be long enough to help address potential issues with air-interface transmission of incoming media content to the UE when the UE encounters the reduced-throughput coverage. Alternatively or additionally, either or both such action could be taken until the bit rate of the media as transmitted by the media server is reduced in view of the UE's reduced-throughput coverage for instance.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

BRIEF DESCRIPTION OF THE DRAWINGS

FIG. 2 is a flow chart depicting an example method in accordance with the disclosure.

FIG. 3 is another flow chart depicting an example method in accordance with the disclosure.

DETAILED DESCRIPTION

An example implementation will now be described in the context of a scenario where a UE is engaged in a streaming media session while moving from being served with relatively high-throughput dual-connectivity to being served with lower-throughput standalone connectivity. In particular, the disclosure will address an example implementation where a UE is engaged in a streaming media session while moving from being served by a cell site with a combination of 4G LTE and 5G NR connections, as EUTRA-NR Dual Connectivity (EN-DC) to being served by a cell site with just a 4G LTE connection.

It will be understood, however, that the disclosed principles could extend to apply with respect to other scenarios as well, such as with respect to other RATS and with respect to other scenarios where a UE's wireless throughput is likely to diminish while the UE is engaged in a streaming media session. Further, it should be understood that other variations from the specific arrangements and processes described are possible. For instance, various described entities, connections, functions, and other elements could be added, omitted, distributed, re-located, re-ordered, combined, or changed in other ways. In addition, it should be understood that operations described as being performed by one or more entities could be implemented in various ways, such as by a processor executing instructions stored in non-transitory data storage, along with associated circuitry or other hardware, among other possibilities.

Figure 1:
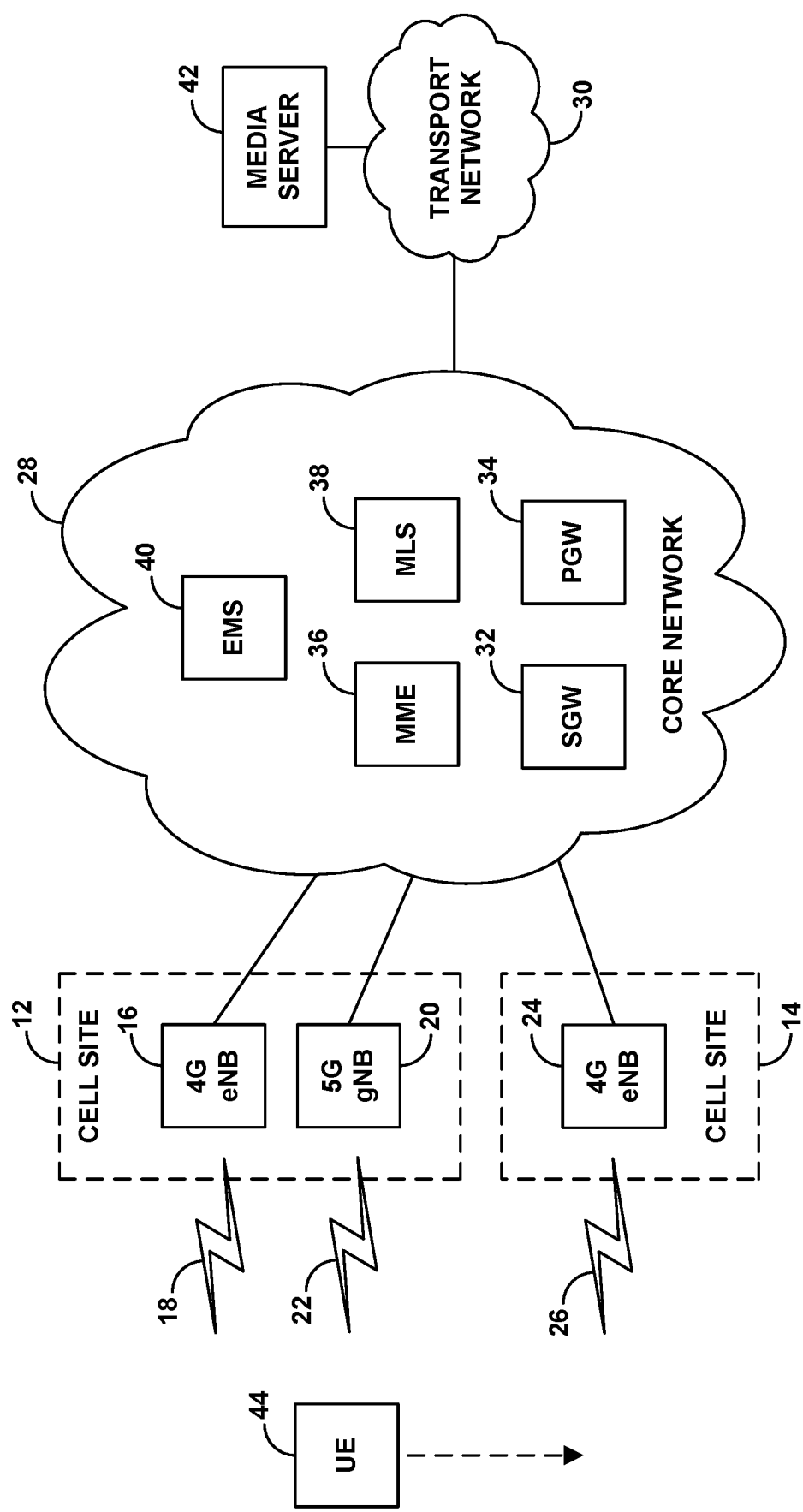
FIG. 1 is a simplified block diagram of an example network arrangement in which aspects of the present disclosure can be implemented.

FIG. 1 depicts an example network arrangement including two cell sites 12, 14 that provide overlapping coverage so as to enable handover of a UE from one cell site to the other.

Cell site 12 is shown including a 4G access node (e.g., 4G evolved Node-B (eNB)) 16 configured to provide 4G LTE service on at least one carrier 18 and a 5G access node (e.g., 5G next-generation Node-B (gNB)) 20 that is configured to provide 5G NR service on at least one carrier 22. These access nodes could be collocated with each other at the cell site 12 (e.g., sharing a common antenna tower and other equipment) and could provide coverage with similar direction and geographic scope as each other, to enable the two access nodes to cooperatively provide UEs with dual-connectivity service. Cell site 14 is then shown including just a 4G access node (e.g., 4G eNB) 24, configured to provide 4G LTE service on at least one carrier 26.

Each of these access nodes could take various forms. For instance, an access node could be a macro access node of the type that would typically include a tower mounted antenna structure for providing a broad range of coverage. Or the access node could be a small cell access node, femtocell access node, or other type of access node that might have a smaller form factor with an antenna structure that provides a narrower range of coverage.

In an example, each of the carriers on which the access nodes provide service could be TDD or FDD as noted above and could thus each have a respective frequency bandwidth at least for downlink communication. Further, the air interface provided by an access node on such a carrier could be configured as described above, to define an array of resource elements grouped into PRBs across the frequency bandwidth. Although carrier-structure and/or service on the 4G and 5G air-interfaces may differ from each other in various ways, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

Each of the access nodes is shown interfaced with a core network 28. The core network 28 could be an evolved packet core (EPC) network, a next generation core (NGC) network, or another network and could provide connectivity with at least one transport network 30, such as the Internet. Further, the core network 28 could be a packet-switched network, compliant with the industry standard system architecture evolution (SAE) or another protocol, and thus various entities that communicate on the core network could each have an assigned Internet Protocol (IP) address and be configured to communicate with each other over packet-based tunnels or other communication interfaces.

In the example shown, the core network 26 includes by way of example a serving gateway (SGW) 32, a packet data network gateway (PGW) 34, a mobility management entity (MME) 36, a mobile location system (MLS) 38, and an element management system (EMS) 40.

With this arrangement, the SGW 32 and PGW 34 could support providing user-plane connectivity for carrying bearer data between each access node and the transport network, so as to enable UEs served by the access nodes to communicate on the transport network 30. And the MME 36 could operate as the core-network controller noted above, responsible for coordinating setup of user-plane bearers for UEs served by the access nodes. Further, the MLS 38 could be a computing-system platform configured to determine (e.g., track) geographic location of UEs using techniques such as trilateration, multilateration (e.g., observed time difference of arrival (OTDOA)), satellite-based positioning, or the like. And the EMS 40 could be a computing-system platform configured to operate as a central repository of operational data for the wireless communication network and to control and manage operation of various network elements.

FIG. 1 also illustrates an example media server 42 accessible through the transport network. This media server could include various front end interfaces for communicating with streaming media clients, such as UEs served by the various access nodes, to initiate and serve streaming media sessions to such clients. The streaming media sessions could take various forms. Without limitation, for instance, a representative streaming media session could be a streaming video session, in which the media server transmits a video stream (e.g., including video and audio content) to a client for real-time playout by the client. Further, as noted above, the media server could be equipped to output this video stream at various bit rates (e.g., resolutions), and to vary the bit rate of streaming to a given client based on information related to throughput supported by the client's network connection.

In addition, FIG. 1 illustrates an example UE 44 that is within coverage of and served by cell site 12 and is moving on a path such that the UE is likely to hand over from being served by cell site 14. In the example implementation, this UE is configured to support engaging 4G service, 5G service, and EN-DC service. For instance, the UE could include both a 4G radio and associated equipment and logic that enables the UE to connect with and be served by a 4G eNB and a 5G radio and associated equipment and logic that enables the UE to connect with and be served by a 5G gNB, and the UE could include logic that enables the UE to be served concurrently with 4G and 5G connectivity such with EN-DC.

In line with the discussion above, when the UE entered into coverage of cell site 12, the UE may have discovered coverage of 4G eNB 16 on a given 4G carrier 18 and may have engaged in random access and RRC signaling to establish a 4G connection with the 4G eNB 16 on that carrier. Further, the UE may have engaged in attach signaling with the MME 36 through its 4G connection with the 4G eNB 16. And the MME 36 may have responsively coordinated setup for the UE of one or more user-plane bearers to enable the UE to engage in communication on the transport network 30.

As noted above, each such bearer could have an associated QoS level indicated by a QCI value, a DSCP value, or the like. In an example implementation, QCI values might range from a QCI 1 having a highest QoS level, as a dedicated bearer with a guaranteed bit rate and other attributes appropriate for conversational voice traffic (e.g., voice over IP (VoIP) calls) down to QCI 9 having a lowest QoS level, as a non-dedicated bearer with non-guaranteed bit rate and other attributes suitable for best-efforts service to accommodate general Internet traffic or the like.

In the arrangement of FIG. 1, the MME 36 may have initially established for the UE a QCI 9 bearer. But other examples are possible as well.

The example bearer established for the UE could include a radio access bearer (RAB) portion that is anchored at the 4G eNB 16 to facilitate user-plane communication between the 4G eNB 16 and the UE and core-network communication between the 4G eNB 16 and the SGW 32. For instance, the RAB could include an S1 user-plane (S1-U) packet tunnel extending between the 4G eNB 16 and the SGW 32 and a data radio bearer (DRB) packet tunnel extending over the air between the 4G eNB 16 and the UE. Further, the example bearer could include an S5 or S8 tunnel between the SGW 32 and the PGW 34.

In practice to configure this bearer, the MME 32 could engage in signaling with the 4G eNB 16 and the SGW 32 to coordinate setup of the S1-U, to trigger signaling between the 4G eNB 16 and UE to set up the DRB, and to trigger signaling between the SGW 32 and the PGW 34 to set up the S5/S8 tunnel. And a Dynamic Host Control Protocol (DHCP) server at or in communication with the PGW 34 could assign to the UE an IP address to enable the UE to communicate on the transport network 30 via the UE's established bearer. Further, each entity along this bearer communication path could establish and store a context record for the UE, which could uniquely identify the UE and could identify the bearer and its associated QoS attributes.

In an example implementation the 4G eNB 16 may also have configured carrier-aggregation service for the UE. Namely, the 4G eNB 16 may have added one or more secondary carriers 18 to the UE's 4G connection with the 4G eNB 16, so as to provide wider aggregate frequency bandwidth on which to serve the UE.

Further, the 4G eNB 16 may also have coordinated setup for the UE of EN-DC service. For instance, operating as MN for the UE, the 4G eNB 16 may have engaged in control signaling with the 5G gNB 20 and the UE to set up for the UE a secondary 5G connection between the UE and the 5G gNB 20 on one or more of the 5G carriers 22. And the 4G eNB 16 may also have engaged in control signaling with the MME, with the 5G gNB 20, and with the UE, to establish a split bearer that would enable the 4G eNB 16 and 5G gNB 20 to cooperatively serve the UE.

Various split-bearer arrangements are possible. Without limitation, one such arrangement could involve the UE's S1-U tunnel being transferred to be anchored at the 5G gNB 20, and the 5G gNB 20 splitting data arriving on that tunnel to serve some of the data to the UE over the UE's 5G connection and to send other of the data over an inter-access-node interface (e.g., X2 interface) to the 4G eNB 16 for the 4G eNB 16 to serve to the UE concurrently over the UE's 5G connection. To configure this split bearer, for instance, the 4G eNB 16 could transmit to the MME 36 a RAB-modification request that causes the MME 36 to coordinate transfer of the UE's S1-U tunnel from being between the SGW 32 and the 4G eNB 16 to instead being between the SGW 32 and the 5G gNB 20. Further, the 4G eNB 16 could engage signaling with the 5G gNB 20 and the UE to arrange for service of the UE with this split bearer.

Before or while the UE has EN-DC so configured, the UE may have further engaged in signaling with the media server 42 to initiate the streaming media session noted above. For instance, the UE may have engaged in packet-based control signaling such as HTTP signaling and/or RTSP signaling with the media server to cause the media server to start streaming media content of the session to the UE, and the UE could be equipped with a streaming media player, which could receive the media content being streamed and play out the media content in real-time on a media-presentation interface, such as a display and/or sound-speaker.

In an example implementation as noted above, for example, the UE may have first obtained from the media server 42 a manifest file that lists segments of the media stream and indicates various bit rates available for the streaming. Based on a consideration of the potential downlink throughput of the UE's air-interface connection, the UE may have requested the media server 42 to stream a particular bit-rate version of the media content, such as one that could likely work well given the throughput potentially available to the UE. Further, if the UE's potentially available throughput changes during the streaming media session, the UE may have requested the media server to switch to streaming the media content at a different bit rate that could work well with the UE's new potentially available throughput. The media server may thus be streaming to the UE at the requested bit rate.

When the UE is served with EN-DC, the UE's potentially available throughput (e.g., peak data rate) may be particularly high, as the UE is being served concurrently over both the UE's 4G connection on one or more 4G carriers and the UE's 5G connection on one or more 5G carriers. Further, this potentially available throughput may be especially high if the carriers on which the UE is served have particularly wide bandwidth with associated high PRB capacity. The UE might determine the UE's potentially available throughput by mapping from aggregate frequency bandwidth on which the UE is served. Further, the UE might consider one or more other factors, such as the UE's actual throughput, coverage strength, and/or broadcast load or other metrics.

As the media server streams media content to the UE at a particular bit rate, the media content could be routed as packet data through the transport network 30 to the PGS 34 and could then flow over the UE's example bearer from the PGW 34 to the SGW 32, and, with the split bearer noted above, from the SGW 32 to the 5G gNB 20. The 5G gNB 20 could then buffer a portion of this data and could serve that portion of data to the UE, scheduling and providing transmission of the data in PRBs on the UE's 5G connection. And the 5G gNB 20 could send a remainder of the data to the 4G eNB 16, which the 4G eNB 16 could buffer and serve to the UE, scheduling and providing transmission of the data in PRBs of the UE's 4G connection. The UE could thus concurrently receive these transmissions on the UE's two connections and could recombine the data as the packet data, and the UE could de-packetize the media content and buffer and play out the media content in real-time.

While the UE is engaged in this streaming media session, the UE may also be moving on a path along which the UE is likely to hand over from being served by cell site 12 to being served instead by cell site 14.

In an example implementation, as the UE moves along that path, the UE may detect and report to 4G eNB 16 that the UE's coverage from 4G eNB 16 is threshold weak and the UE's coverage from neighboring 4G eNB 24 is threshold strong (e.g., threshold stronger than the UE's coverage from 4G eNB 16.) In response, the 4G eNB 16 could then process a handover of the UE from cell site 12 to cell site 14. For instance, the 4G eNB 16 could first engage in signaling to tear down the UE's EN-DC service, undoing the bearer split and having the MME 36 transfer the UE's S1-U tunnel back to be anchored at the 4G eNB 16, thus reverting the UE to standalone 4G connectivity. Further, the 4G eNB 16 could engage in handover signaling with the neighboring 4G eNB 24 to transfer the UE from being connected with the 4G eNB 16 to being connected instead with the 4G eNB 24, which could involve coordinating configuration of a 4G connection on one or more of carriers 26 between the 4G eNB 24 and the UE and transferring the UE's S1-U tunnel to be anchored now at the 4G eNB 24.

This handover process would thus transition the UE from being served with the streaming media session through the UE's 4G and 5G connections with cell site 12 to the UE being served with the streaming media session through just the UE's 4G connection with cell site 14.

This handover process could result in a reduction of the UE's potentially available throughput, at least because the UE transitions from having dual-connectivity to having just standalone 4G connectivity. While various other factors may come into play in practice, we can assume that the peak data rate theoretically to the UE from cell site 14 is less, and perhaps substantially less, than the peak data rate theoretically available when the UE is served with EN-DC by cell site 12.

As discussed above, this likely reduction on throughput available to the UE during the course of the UE's ongoing streaming media session could cause problems. For instance, as noted above, as the media server streams the media content at a given bit rate that may have been workable with the UE's higher-throughput EN-DC connection, the UE's newly serving 4G eNB 24 may be unable to transmit the incoming media content quickly enough to the UE. Particularly if the 4G eNB 24 is serving other UEs at the same time and needs to fairly allocate PRBs among all of its served UEs, and if the UE's bearer is a low-QoS QCI-9 bearer as noted above, the 4G eNB 24 may not have the air-interface capacity available for use to transmit the incoming media-content packets to the UE in a timely manner. As a result, the 4G eNB 24 may end up dropping some of the incoming media-content packets and/or may transmit them too late, in either case possibly causing user-experience issues with playout of the media content at the UE.

As noted above, the present disclosure provides at least two mechanisms to help address this situation. Both mechanisms provide for detecting a scenario where a UE is engaged in a streaming media session and is going to encounter reduced-throughput coverage, and, in response to detecting the scenario, proactively taking action before the UE transitions to the reduced-throughput coverage, with the action helping to facilitate successful transmission of the media content to the UE even when the UE then transitions to the reduced-throughput coverage.

In particular, one mechanism provides for responsively increasing a QoS level of the bearer on which the UE is receiving streaming media of the session, so that when the UE ultimately transitions to the reduced-throughput coverage, the higher QoS level of the UE's bearer may help enable successful transmission of the media content to the UE. And another mechanism provides for responsively initiating transcoding of the media content to a lower bit rate as the media content is en route to the UE as part of the streaming media session, so as to help enable successful transmission of the media content to the UE when the UE transitions to the reduced-throughput coverage.

These mechanisms could be carried out by various entities in a system as shown in FIG. 1 (such as by one or more core-network entities) or in another such system and could involve operations of various entities in concert. By way of example, one entity might be responsible for determining when the UE is engaged in a streaming media session, another entity might be responsible for determining when the UE is headed toward reduced-throughput coverage, and yet another entity might be responsible for integrating those two pieces of information based on UE identification information or the like to determine that, while the UE is engaged in a streaming media session, the UE is headed toward reduced-throughput coverage. Still further, another entity might then responsively carry out (e.g., cause to be carried out) the adjustment of QoS of the UE's bearer and/or the transcoding to a lower bit rate of the media content en route to the UE. In an example implementation, for instance, the EMS 40 could coordinate these various operations.

When the UE is served with EN-DC and is receiving streaming media that is flowing over a QCI 9 bearer anchored and split at the 5G gNB 20, and the UE is headed toward cell site 14, the act of determining that the UE is engaged in a streaming media session could be carried out at least in part through deep packet inspection at one or more points along the bearer.

For instance, an S1-based packet sniffer (e.g., a programmed computing system and/or associated logic) disposed at the SGW 32, at the 5G gNB 20, and/or in the network path between those entities (among other possibilities) could evaluate packets being transmitted on the S1 tunnel of the UE's QCI 9 bearer to determine, based on IP address and port information and/or other header and/or payload information that the packets are part of streaming media from media server 42. Further, the packet sniffer could also determine an identity of the UE and/or of the bearer. And upon determining through this or another process that the UE (or a UE having the identified bearer) is engaged that streaming media session, the packet sniffer could then report that fact to the EMS 40, which the EMS 40.

Further, as the UE is served with EN-DC by the 4G eNB 16 and the 5G gNB 20, the act of determining that the UE is headed toward reduced-throughput coverage or otherwise predicting that the UE will experience a coverage-throughput reduction could be carried out by any entity or entities that could track the UE's location in correlation with likely levels of coverage throughput.

Here, the act of determining that the UE is headed toward reduced-throughput coverage or will otherwise experience a coverage-throughput reduction could involve determining that the UE is currently served with coverage having first throughput (e.g., first peak data rate) and that the UE is going to encounter a situation where the UE may transition to coverage that has a second throughput (e.g., second peak data rate) that is lower than the first throughput. As noted above, this could be based on evaluations of the frequency bandwidth of the coverage, such as based on a determination that the UE is moving from being served with first coverage that has first frequency bandwidth to being served by second coverage that has less second frequency bandwidth that is narrower, and perhaps substantially narrower, than the frequency bandwidth. Alternatively or additionally, this could be based on evaluation of other factors, such as load and the like, perhaps even without the UE moving to a new cell site.

By way of example, in the arrangement discussed above, the MME 36 might track UE handover data over time and use the tracked data as a basis to predict that the UE is soon going to hand over from being served with EN-DC by cell site 12 to being served with 4G-only service by cell site 14. For instance, each time a UE handover occurs, the MME might receive signaling information indicative of the handover, indicating the source cell site or access node and the target cell site or access node. Based on this data, the MME could establish typical path information as a typical pattern of cell sites corresponding with likely movement of UEs over time. And applying this data to the UE at issue, the MME might determine that the UE currently served by cell site 12 with EN-DC is soon going to hand over to being served with 4G-only service by cell site 14, which in the arrangement discussed above would most likely involve a reduction of the UE's throughput. The MME could then report this information to the EMS 40, similarly correlated with UE and/or bearer identification, as an indication or basis to establish that the UE is headed to reduced-throughput coverage.

Alternatively or additionally, the MLS 38 might be involved with tracking geographic location of the UES over time, and that geographic location information in association with data related to cell site coverage scope could be used similarly as a basis to predict that the UE at issue is likely to soon transition from being served with EN-DC by cell site 12 to being served instead with 4G-only service by cell site 14. And the MLS could similarly report this information to the EMS 40 as an indication or basis to establish that the UE is headed to reduced-throughput coverage.

Based on these reports and/or other information establishing that the UE is engaged in a streaming media session and is going to encounter reduced-throughput coverage, the EMS 40 could then responsively trigger either or both of the actions described above, among other possibilities.

For example, based on this information, the EMS 40 could engage in signaling to trigger an increase in QoS level of the UE's QCI 9 bearer on which the streaming media is flowing to the UE. For instance, the EMS 40 could signal to the 4G eNB 16 as the UE's master node in EN-DC service to trigger this, and/or the EMS 40 could signal to the MME 36 to trigger this.

Without limitation, for example, the EMS 40 could transmit to the 4G eNB 16 a signaling message that the 4G eNB 16 will interpret as a directive or other trigger to invoke an increase in QoS level of the UE's QCI 9 bearer. In response, the 4G eNB 16 might then generate and transmit to the MME 36 a RAB-modification request that requests modification of one or more QoS attributes of the UE's QCI 9 bearer. For instance, this could be a request to increase a priority level of data on the bearer and/or to increase the bearer's QCI level to a level such as QCI 6 or the like. In response, the MME could then engage in signaling with the 5G gNB 20 (e.g., via the 4G eNB 16) and with the SGW 32, to implement that QoS increase.

This increase of QoS of the UE's bearer on which the UE is receiving the streaming media could cause the UE's serving access nodes, the 4G eNB 16 and 5G gNB 20, to give higher priority to scheduling and transmission of the incoming data on that bearer than the access nodes would have given before the increase in QoS of the bearer. And in turn, if and when the UE then does hand over from cell site 12 to cell site 14, the UE's bearer with that increased level of QoS could be transferred to be anchored at the UE's new serving access node, 4G eNB 24, and so the 4G eNB 24 would likewise give higher priority to scheduling and transmission of incoming data on that bearer than it would have given without the QoS increase. As a result, this process may help to ensure full and successful continued transmission of the incoming media content to the UE even once the UE transitions to be served by the reduced-throughput coverage.

Alternatively or additionally, the EMS 40 could transmit to a core-network entity within the UE's bearer communication path a signaling message that would be interpreted by the entity as a directive or other trigger to start transcoding to a lower bit rate (e.g., lower resolution) the media content flowing over the bearer to the UE. Without limitation, in an example implementation, this entity could be the PGW 34, the SGW 32, and/or another computing system in place at least to carry out this operation. Upon receipt of this signaling message, the entity could start to transcode down the bit rate of the media content flowing over the bearer to the UE.

This transcoding down of media content bit rate could be done in various ways now known or later developed. For example, the entity might dynamically decode the encoded media content encoded at a first bit rate and then re-encode the media content at a second, lower bit rate. Alternatively, the entity may be able to change one or more other aspects of the media content en route to the UE to reduce its bit rate. Other examples may be possible as well.

This decrease in bit rate of the media content en route to the UE would reduce the quantity of data per unit time flowing to the UE's serving access nodes, the 4G eNB 16 and 5G gNB 20, for transmission over the air to the UE. And in turn, if and when the UE then does hand over from cell site 12 to cell site 14, that reduced data flow could help ensure full and successful continued transmission of the incoming media content to the UE even given the throughput constraint.

FIG. 2 is a flow chart depicting an example method that could be carried out in accordance with the present disclosure to proactively reconfigure communication to a UE in anticipation of the UE experiencing a coverage-throughput reduction when the UE is receiving streaming media. As shown in FIG. 2, at block 46, the method includes predicting, when the UE is receiving streaming media, that the UE is going to experience the coverage-throughput reduction. And at block 48, the method includes, based at least in part on the predicting, proactively increasing a QoS level of a bearer through which the UE is receiving the streaming media, the proactively increasing occurring before the UE experiences the coverage-throughput reduction so that the QoS level is increased by when the UE experiences the coverage-throughput reduction.

In line with the discussion above, the act of proactively increasing the QoS level of the bearer through which the UE is receiving the streaming media could take various forms. For instance, it could involve engaging in signaling to trigger a QoS modification of the bearer, such as transmitting to an entity a signaling message as a directive or request to which the entity is configured to respond by itself triggering or causing the QoS modification. Further, the modification could involve modifying a QoS parameter of the bearer to increase air-interface scheduling priority of data flowing on the bearer and/or could involve changing the QCI of the bearer from a first QCI with a first associated QoS level to a second QCI with a second associated QoS level higher than the first associated QoS level.

Further, as noted above, the increasing of the QoS level could be temporary but could last until at least after the UE has experienced the coverage-throughput reduction, to help ensure successful transmission of the incoming streaming media to the UE once the coverage-throughput reduction occurs.

FIG. 3 is another flow chart depicting an example method that could be carried out in accordance with the present disclosure to proactively reconfigure communication to a UE in anticipation of the UE experiencing a coverage-throughput reduction when the UE is receiving streaming media from a media server. As shown in FIG. 3, at block 50, the method includes predicting, when the UE is receiving streaming media from a media server, that the UE is going to experience the coverage-throughput reduction. And at block 52, the method includes, based at least in part on the predicting, proactively initiating transcoding of the streaming media to reduce a bit rate of the streaming media as the streaming media en route to the UE in a communication path between the media server and the UE, the initiating occurring before the UE experiences the coverage-throughput reduction so that the bit rate of the streaming media is reduced by when the UE experiences the coverage-throughput reduction.

In line with the discussion above, the act of proactively initiating the transcoding of the streaming media to reduce a bit rate of the streaming media as the streaming media en route to the UE in a communication path between the media server and the UE could involve signaling (e.g., through a network communication interface) to an intermediary or other entity of a bearer over which the streaming media flows to the UE, to cause the entity to start transcoding down the bit rate of the streaming media as the streaming media flows along that communication path. For instance, the entity could be a core-network gateway serving the UE (e.g., a PGW or other such core-network gateway involved with the UE's bearer), and the signaling could involve transmitting to the entity a signaling message as a directive or request to which the entity is configured to respond by starting the transcoding.

Further, as noted above, the transcoding of the streaming media en route to the UE could be temporary but could last until at least after the UE has experienced the coverage-throughput reduction, to help ensure successful transmission of the incoming streaming media to the UE once the coverage-throughput reduction occurs.

In addition, as discussed above, the UE experiencing the coverage-throughput reduction in each of these methods could take various forms. For instance, it could involve the UE transitioning from being served with first coverage that supports up to a first throughput to being served instead with second coverage that supports up to just a second throughput that is lower than the first throughput. Alternatively or additionally, it could involve the UE transitioning from being served with first coverage having a first frequency bandwidth to being served instead with second coverage having a second frequency bandwidth narrower than the first frequency bandwidth. And still further, alternatively or additionally, it could involve the UE transitioning from being served with dual-connectivity (e.g., EN-DC) to being served instead with standalone connectivity (e.g., 4G-only or 5G-only). Other scenarios are possible as well.

Further, as discussed above, the act of predicting, when the UE is receiving streaming media, that the UE is going to experience the coverage-throughput reduction in each of these methods could involve (i) determining that the UE is engaged in a streaming media session in which the UE is receiving streaming media and (ii) determining that the UE is going to experience the coverage-throughput reduction.

Figure 4:
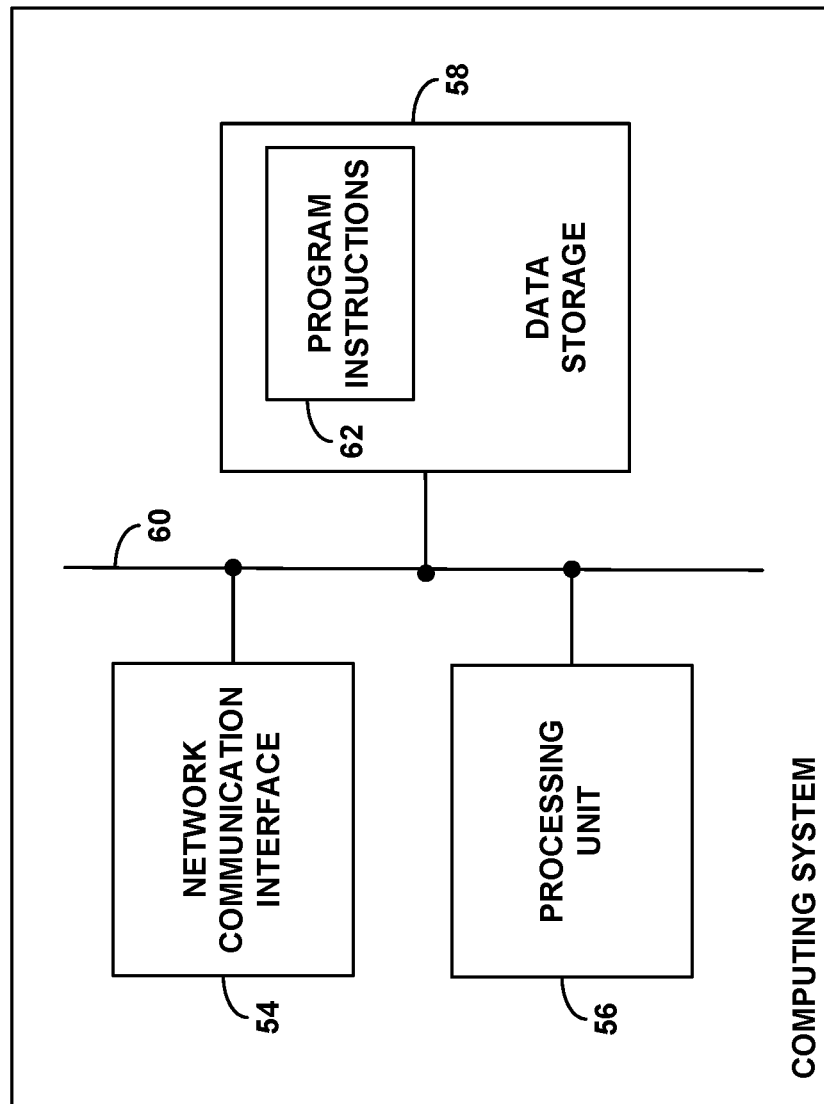
FIG. 4 is a simplified block diagram of an example computing system operable in accordance with the disclosure.

FIG. 4 is next a simplified block diagram of an example computing system that could carry out various features as described herein. As suggested above, this computing system could implemented by one or more entities in an example system such as that shown in FIG. 1 for instance. By way of example, aspects of the computing system could be provided by the EMS 40 and/or one or more of the access nodes, among other possibilities.

As shown in FIG. 4, the computing system includes at least one network communication interface 54, at least one processing unit 56, and at least one non-transitory data storage 58, which could be integrated or communicatively linked together by a system bus, network, or other connection mechanism 60.

The at least one network communication interface 54 could comprise a wired or wireless network communication module, such as an Ethernet interface, through which the computing system can communicate with other entities. And the at least one processing unit 56 could comprise one or more processors (e.g., one or more general purpose processors and/or specialized processors), such as one or more microprocessors or specialized processors.

The at least one non-transitory data storage 58 could comprise one or more volatile and/or non-volatile storage components, such as magnetic, optical, or flash storage media. And as further shown, the data storage could hold, store, encode, or otherwise embody program instructions 62. In a representative implementation, those program instructions 62 could be executable by the at least one processing unit 56 to carry out various features described herein such as those described with respect to FIGS. 2 and/or 3 for instance.

Figure 5:
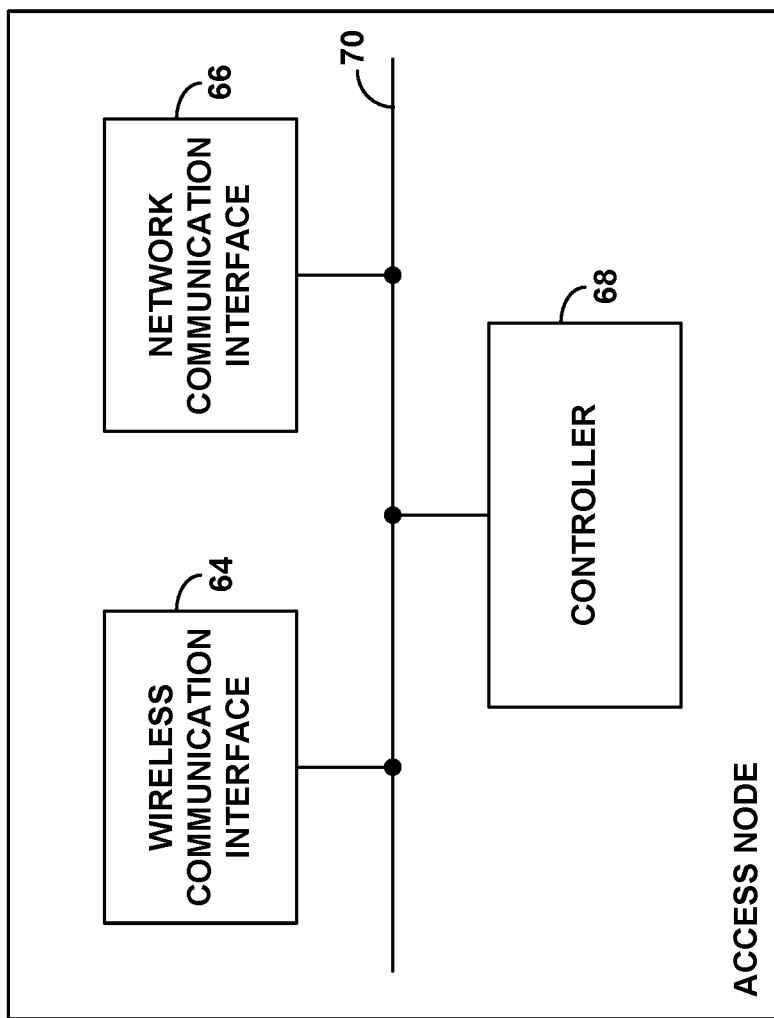
FIG. 5 is a simplified block diagram of an example access node operable in accordance with the disclosure.

Finally, FIG. 5 is a simplified block diagram of an example access node that could be operable in accordance with the present disclosure. As shown, the example access node includes a wireless communication interface 64 through which to engage in communication with UEs served by the access node, a network communication interface 66 through which to engage in communication with other access nodes and with various network infrastructure, and a controller 68 configured to cause the access node to carry out various access node operations described herein. And as shown, these components being integrated or communicatively linked together by a system bus, network, or other connection mechanism 70.

In an example implementation, the wireless communication interface 64 could include a transceiver configured to serve UEs in accordance with one or more RATs such as those noted above, along with a power amplifier and antenna structure that radiates to provide for air interface communication between the access node and served UEs. Further, the network communication interface 66 could comprise a wired or wireless network communication module, such as an Ethernet interface, through which the access node can communicate with other entities.

The controller 68 could then take various forms, including various combinations of hardware, firmware, and software for instance. By way of example, the controller could comprise one or more general purpose processors (e.g., microprocessors) and/or one or more special purpose processors (e.g., application specific integrated circuits), and one or more non-transitory data storage elements (e.g., magnetic, optical, and/or flash storage). And the data storage could hold program instructions executable by the processor(s) to carry out various access node functions described herein.

It should also be understood that the present disclosure additionally contemplates at least one non-transitory computer readable medium that stores, has encoded thereon, or otherwise embodies program instructions executable to carry out such operations as well.

Exemplary embodiments have been described above. Those skilled in the art will understand, however, that changes and modifications may be made to these embodiments without departing from the true scope and spirit of the invention.

We claim:

1. A method for proactively reconfiguring communication to a user equipment device (UE) in anticipation the UE experiencing a transition from being served with dual-connectivity to being served instead with standalone connectivity when the UE is receiving streaming media, the method comprising:

predicting by a core-network entity, when the UE is receiving streaming media, that the UE is going to experience the transition from being served with dual-connectivity to being served instead with standalone connectivity; and based at least in part on the predicting, proactively increasing a quality-of-service (QoS) level of a bearer through which the UE is receiving the streaming media, wherein the proactively increasing occurs before the UE experiences the transition from being served with dual-connectivity to being served instead with standalone connectivity so that the QoS level is increased by when the UE experiences the transition from being served with dual-connectivity to being served instead with standalone connectivity.

2. The method of claim 1, wherein the dual connectivity is EUTRA-NR Dual Connectivity (EN-DC) in which the UE has concurrent connections on 4G Long Term Evolution (4G LTE) and 5G New Radio (5G NR), and wherein the standalone connectivity is standalone 4G LTE connectivity in which the UE has just a 4G LTE connection or standalone 5G NR connectivity in which the UE has just a 5G NR connection.

3. The method of claim 1, wherein predicting, when the UE is receiving streaming media, that the UE is going to experience the transition from being served with dual-connectivity to being served instead with standalone connectivity comprises:
   determining that the UE is engaged in a streaming media session in which the UE is receiving streaming media; and
   determining that the UE is going to experience the transition from being served with dual-connectivity to being served instead with standalone connectivity.

4. The method of claim 1, wherein proactively increasing the QoS level of the bearer through which the UE is receiving the streaming media comprises engaging in signaling to trigger a QoS modification of the bearer.

5. The method of claim 1, wherein proactively increasing the QoS level of the bearer through which the UE is receiving the streaming media comprises modifying a QoS parameter of the bearer to increase air-interface scheduling priority of data flowing on the bearer.

6. The method of claim 1, wherein the bearer has a QoS Class Identifier (QCI) with a first associated QoS level, and wherein proactively increasing the QoS level of the bearer comprises changing the QCI of the bearer to a second QCI with a second associated QoS level higher than the first associated QoS level.

7. The method of claim 1, wherein the increasing of the QoS level is temporary but lasts until at least after the UE has experienced the transition from being served with dual-connectivity to being served instead with standalone connectivity.

8. A computing system configured to proactively reconfigure communication to a user equipment device (UE) in anticipation the UE experiencing a transition from being served with dual-connectivity to being served instead with standalone connectivity when the UE is receiving streaming media, the computing system being in a core network and comprising:
   at least one network communication interface;
   at least one processing unit;
   at least one non-transitory data storage; and
   program instructions stored in the at least one non-transitory data storage and executable by the at least one processing unit to carry out operations including:
      predicting, when the UE is receiving streaming media, that the UE is going to experience the transition from being served with dual-connectivity to being served instead with standalone connectivity, and
      based at least in part on the predicting, proactively increasing a quality-of-service (QoS) level of a bearer through which the UE is receiving the streaming media, wherein the proactively increasing occurs before the UE experiences the transition from being served with dual-connectivity to being served instead with standalone connectivity so that the QoS level is increased by when the UE experiences the transition from being served with dual-connectivity to being served instead with standalone connectivity.

9. The computing system of claim 8, wherein the dual connectivity is EUTRA-NR Dual Connectivity (EN-DC) in which the UE has concurrent connections on 4G Long Term Evolution (4G LTE) and 5G New Radio (5G NR), and wherein the standalone connectivity is standalone 4G LTE connectivity in which the UE has just a 4G LTE connection or standalone 5G NR connectivity in which the UE has just a 5G NR connection.

10. The computing system of claim 8, wherein predicting, when the UE is receiving streaming media, that the UE is going to experience the transition from being served with dual-connectivity to being served instead with standalone connectivity comprises:
    determining that the UE is engaged in a streaming media session in which the UE is receiving streaming media; and
    determining that the UE is going to experience the transition from being served with dual-connectivity to being served instead with standalone connectivity.

11. The computing system of claim 8, wherein proactively increasing the QoS level of the bearer through which the UE is receiving the streaming media comprises engaging in signaling through a network communication interface, of the at least one network communication interface, to trigger a QoS modification of the bearer.

12. The computing system of claim 8, wherein proactively increasing the QoS level of the bearer through which the UE is receiving the streaming media comprises modifying a QoS parameter of the bearer to increase air-interface scheduling priority of data flowing on the bearer.

13. The computing system of claim 8, wherein the bearer has a QoS Class Identifier (QCI) with a first associated QoS level, and wherein proactively increasing the QoS level of the bearer comprises changing the QCI of the bearer to a second QCI with a second associated QoS level higher than the first associated QoS level.

14. The computing system of claim 8, wherein the increasing of the QoS level is temporary but lasts until at least after the UE has experienced the transition from being served with dual-connectivity to being served instead with standalone connectivity.

15. At least one non-transitory computer-readable medium embodying program instructions executable by at least one processing unit in a core network to carry out operations including:
    predicting, when a user equipment device (UE) is receiving streaming media, that the UE is going to experience a transition from being served with dual-connectivity to being served instead with standalone connectivity, and
    based at least in part on the predicting, proactively increasing a quality-of-service (QoS) level of a bearer through which the UE is receiving the streaming media, wherein the proactively increasing occurs before the UE experiences the transition from being served with dual-connectivity to being served instead with standalone connectivity so that the QoS level is increased by when the UE experiences the transition from being served with dual-connectivity to being served instead with standalone connectivity.

16. The at least one non-transitory computer-readable medium of claim 15, wherein the dual connectivity is EUTRA-NR Dual Connectivity (EN-DC) in which the UE has concurrent connections on 4G Long Term Evolution (4G LTE) and 5G New Radio (5G NR), and wherein the standalone connectivity is standalone 4G LTE connectivity in which the UE has just a 4G LTE connection or standalone 5G NR connectivity in which the UE has just a 5G NR connection.

17. The at least one non-transitory computer-readable medium of claim 15, wherein proactively increasing the QoS level of the bearer through which the UE is receiving the streaming media comprises engaging in signaling through a network communication interface, of the at least one network communication interface, to trigger a QoS modification of the bearer.

18. The at least one non-transitory computer-readable medium of claim 15, wherein proactively increasing the QoS level of the bearer through which the UE is receiving the streaming media comprises modifying a QoS parameter of the bearer to increase air-interface scheduling priority of data flowing on the bearer.

19. The at least one non-transitory computer-readable medium of claim 15, wherein the bearer has a QoS Class Identifier (QCI) with a first associated QoS level, and wherein proactively increasing the QoS level of the bearer comprises changing the QCI of the bearer to a second QCI with a second associated QoS level higher than the first associated QoS level.

20. The at least one non-transitory computer-readable medium of claim 15, wherein the increasing of the QoS level is temporary but lasts until at least after the UE has experienced the transition from being served with dual-connectivity to being served instead with standalone connectivity.

* * * * *